United States Patent [19]

Lemp et al.

[11] Patent Number: 5,056,632
[45] Date of Patent: Oct. 15, 1991

[54] AUXILIARY-POWER-ACTIVATED CLUTCH AND GEAR-SHIFTING DEVICE

[75] Inventors: Norbert Lemp, Tettnang; Rainer Petzold, Friedrichshafen, both of Fed. Rep. of Germany

[73] Assignee: Zahnradfabrik Friedrichshafen, AG., Friedrichshafen, Fed. Rep. of Germany

[21] Appl. No.: 458,688

[22] PCT Filed: Aug. 16, 1988

[86] PCT No.: PCT/EP88/00727
§ 371 Date: Jan. 31, 1990
§ 102(e) Date: Jan. 31, 1990

[87] PCT Pub. No.: WO89/01881
PCT Pub. Date: Mar. 9, 1989

[30] Foreign Application Priority Data
Aug. 22, 1987 [DE] Fed. Rep. of Germany ....... 3728057

[51] Int. Cl.$^5$ .............................. B60K 41/22
[52] U.S. Cl. .................. 192/3.63; 192/3.54; 192/114 R; 74/334; 74/483 R
[58] Field of Search ............... 192/3.51, 3.54, 3.61, 192/3.62, 3.63, 114 R; 74/334, 483 R; 188/67

[56] References Cited
U.S. PATENT DOCUMENTS
2,508,263 5/1950 Jirsa .................... 74/334 X
3,011,357 12/1961 Binder ..................... 192/3.63 X FOREIGN PATENT DOCUMENTS
82893 7/1983 European Pat. Off. .
166823 1/1986 European Pat. Off. .
3536559 4/1986 Fed. Rep. of Germany .
598153 2/1948 United Kingdom ................... 74/334
2057607 4/1981 United Kingdom .
2112100 7/1983 United Kingdom .

Primary Examiner—Richard Lorence
Attorney, Agent, or Firm—Albert M. Zalkind

[57] ABSTRACT

Auxiliary power actuated clutch and gear shifting device for a motor vehicle transmission with function selector and a gear change mechanism controlled by the driver through a clutch actuating mechanism at the clutch pedal wherein a response signal to the driver is received when a gear is engaged in the transmission or the transmission is in neutral. Located at the clutch pedal and connected with it mechanically is a safety device that holds the actuated clutch pedal against movement when a gear is disengaged in the transmission during the shifting of gears. The safety device holds the clutch pedal clamped in actuated position until a gear is engaged in the transmission whence the driver can carry out the procedure of engaging the clutch again in known fashion. The safety device consists of a clamping mechanism that grips a piston rod connecting to the clutch pedal to prevent further operation until the clutch pedal is released. At the time the clutch pedal is clamped the driver's response signal is manifested by lack of spring restoring force on the clutch pedal to return to idle position.

2 Claims, 1 Drawing Sheet

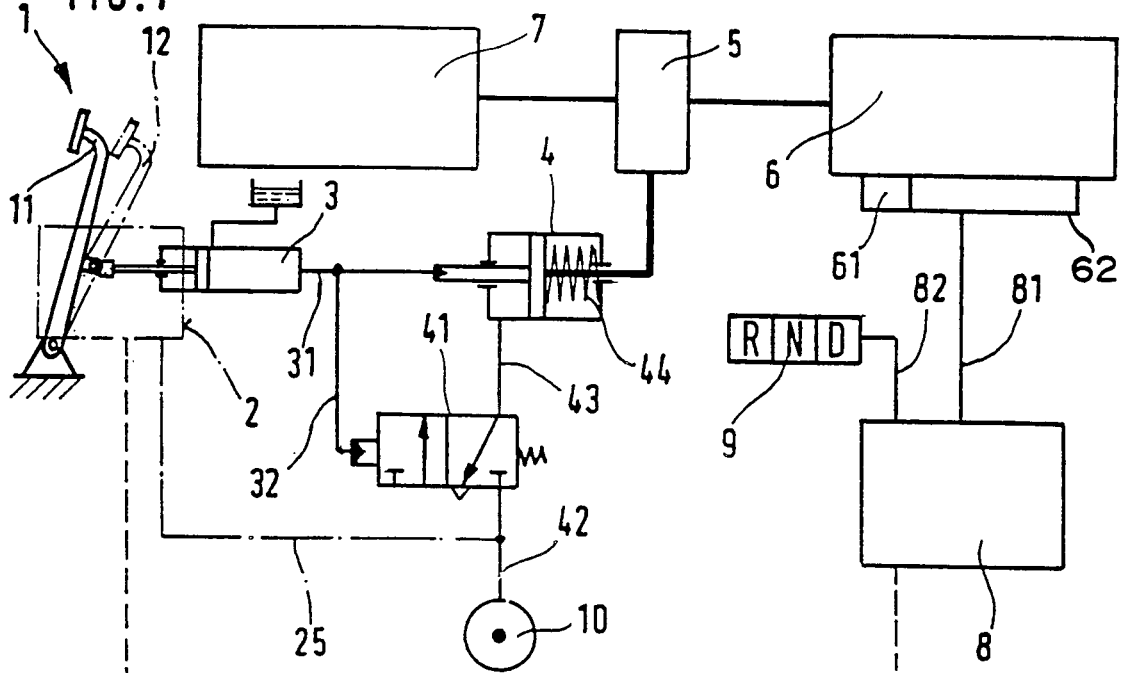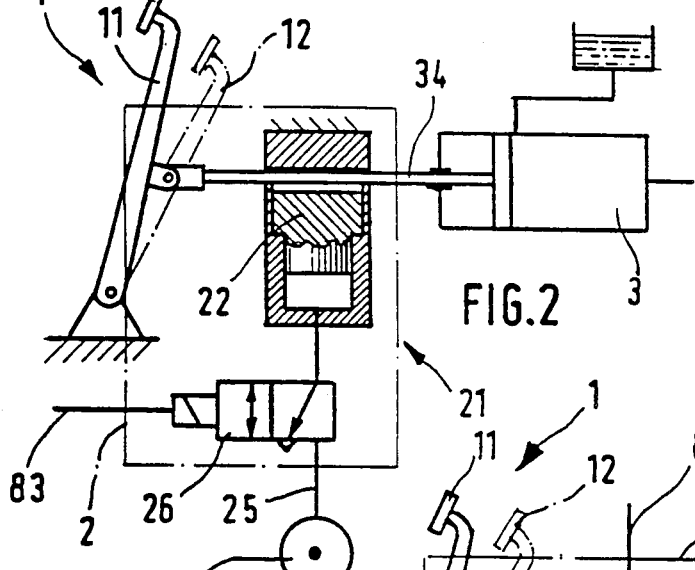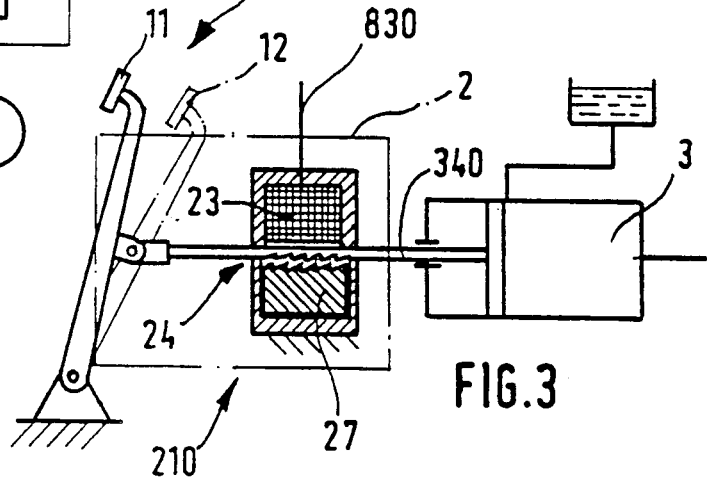

AUXILIARY-POWER-ACTIVATED CLUTCH AND GEAR-SHIFTING DEVICE

The invention is concerned with an auxiliary power actuated clutch and gear shifting device for motor vehicles with a gear preselector and a gear-change mechanism controlled by the driver through the clutch actuation mechanism at the clutch pedal and produces a response signal when the gear is engaged in the transmission after the shifting of gears.

BACKGROUND OF THE INVENTION

Such gear shifting devices in which the driver, or even an electronic device, selects only the gear desired and the shifting in the transmission itself is not carried out directly by the driver through a gear shift linkage, but by an auxiliary power actuated device for the coupling, are known in many embodiments; for example:

ZF-Typenblatt Electro-Pneumatic Shifting Device (ES) —Easyshift—for Synchron Transmission F 43546/RT 34000 8.85, ZF-Typenblatt Automated Preselection Shifting Device (AVS) for Synchron Transmission F32437/RT 3431-8.85, Electronic-Pneumatic Shifting Device (EPS) Trucks Daimler-Benz, AG, Order No. 6510302300, of 3.86 Scania - shift gears easier with a computer, page 4, column 2, second paragraph.

In all of these embodiments, the opening and closing of the clutch, and consequently of the drive trains between the engine and the transmissions, continues to be accomplished by the driver through the clutch pedal. While the driver knows when the gear is engaged as a consequence of direct contact with the shifting means in the transmission when gears are shifted by a gear shift linkage, that information, with the actuation of the gearshift lever and the gear shift linkage, is not in an auxiliary power actuated gear shifting mechanism. For operating the clutch at the proper time, and especially for closing the clutch after the shifting of gears in the transmission has been completed, response signals to the driver such as acoustical, optical and a physical feel are known.

After the conclusion of the shifting procedures in the transmission, the driver train can be closed again by the driver. The effort in the prior art devices to close the drive train as quickly as possible can result in difficulties. For example, if the driver doesn't wait for a response signal that a gear has been engaged in the transmission but closes the clutch without a gear having been shifted, the transmission will be in the neutral position. In such a case, the drive train is acutally not closed, although the clutch is in the closed position. Repeat shifting of gears by means of the clutch pedal is rendered difficult in most cases because all the gears have to be synchronized again before the gear shifting takes place. Thus the speeding up of the gear shifting process desired by the driver is delayed as a result of such procedure, or, a shifting of gears is prevented entirely by further incorrect operation.

SUMMARY OF THE INVENTION

Therefore, the object of the invention is to provide a power actuated clutch device having a novel safety device wherein the clutch can be closed only after the shifting of gears is completed.

With the locating of the safety device adjacent to the clutch pedal and with the locking of that pedal itself until each subsequent gear is engaged in a shifting of gears, a shifting of the transmission into the neutral position is prevented in a simple manner. When the clutch pedal is pressed intentionally, no spring restoring force acting on the pedal is felt on the foot of the driver because the pedal has been locked against movement, so that he immediately becomes aware of his incorrect operation and can correct it. In particular, he can always engage the clutch gently because he, in fact, remains with his foot on the opening position of the clutch pedal or only leaves that opening position for a short time, or preferably does so slightly.

Additional devices for the gentle engaging of the clutch are not required in case of incorrect operation because he becomes aware of that condition immediately and not just in the initial position of the clutch pedal.

For it to be possible for the clutch pedal to be returned to the initial position when the vehicle is shut off without a gear being engaged, it is relatively easy to connect the novel safety device with an operating lever or an operating shifting device that is not shifted into the forward travel position and in fact is prevented from being so shifted, for the purpose of shifting gears.

The novel safety device can be a locking clamp or equivalent holding device and is actuated electronically or by pressure means, and preferably by compressed air. Actuation by compressed air is advantageous because a source of compressed air for the auxiliary power actuation of the clutch is already available. As will be seen, saw tooth shaped engaged elements of the holding or clamping surfaces are also especially advantageous, because the nevertheless considerable restoring forces are held at the clutch pedal by interengaged teeth with slight force to bring the elements against each other and, when the gear tooth design is sufficiently precise, practically every position of the clutch pedal can be clamped.

The invention is not limited to a combination of the features of the claims. For an expert, additional, logical possible combinations of claims and individual features mentioned in claims follow from the statement of the objects.

Further details regarding the invention are explained in conjunction with the drawing as described below.

FIG. 1 shows an auxiliary power actuated device for a clutch with a novel safety device adjacent and connected to the clutch pedal. FIG. 2 shows a safety device actuated with pressure means as a pedal clamping device to hold the pedal in an actuated position.

FIG. 3 shows a clamp device actuated by a solenoid clamping device.

Between the propulsion engine 7 and a motor vehicle transmission 6, a clutch 5 is located (FIG. 1) and actuated by a clutch pedal 1 by means of an auxiliary power device, i.e., a clutch pedal 1 connected mechanically with a pedal operated cylinder 3. A compressed air line 31 leads therefrom to the clutch operating cylinder 4 for closure of the clutch 5; and a compressed air line 32 to a control valve 41, which is connected with a pressure medium source 10 by air pressure conduit 42 and with the clutch operating cylinder 4 by an air pressure conduit 43. Another air pressure conduit 25 leads from the pressure medium source 10 to a safety device. An electronic unit 8 is connected primarily with the transmission 6 and a function selector 9 and to the novel safety device 2 by electric lines 81, 82, 83. The function selector 9 is preferably a selector lever or selector switch with the settings of forward travel D, reverse travel R, and a neutral position N.

In FIG. 2, the safety device 2 is a frictional clamp 21 on piston rod 34. The gripping or holding pressure comes from a pressure medium actuated cylinder 22, preferably an air pressure cylinder, that can be connected with the pressure medium source by a solenoid valve 26 or with the valve ventilation mechanism.

In FIG. 3, the safety device 210 is a clamp 24 wherein a solenoid 23 pulls a jaw 27 so that the saw teeth on piston rod 340 and jaw 27 mesh, i.e., interengage with each other to hold clutch pedal 1 in the actuated position 12. As a result of the of the relatively fine gear tooth system of the clamping elements in FIG. 3, the clamping can take place through the entire piston travel route. It is possible, through a suitable gripping surface of the clamping elements, to hold the clutch pedal 1 firmly in the actuated position with relatively small clamping force.

The Operation is as follows:

When the clutch pedal 1 is actuated from the idle position shown at 11, pressure medium in the pedal operated cylinder 3 is conveyed to the clutch closure operating cylinder 4 and the clutch 5 and the control valve 41 through the compressed air conduits 31 and 32. By that means, the ventilation mechanism of the control valve 41 is shut off and compressed air is conveyed to clutch operating cylinder from the pressure medium source 10 through the air conduits 42, 43. The compressed air puts the return spring 44 of the clutch operating cylinder 4 and the locking spring (not shown) of the clutch 5 under pressure and opens the clutch.

Simultaneously with the acutation of the clutch pedal from the idle position at 11 to the actuated position at 12, the transmission 6 is shifted to the neutral position and a newly-selected gear is engaged by a preselector or an electronic apparatus, as is known to one skilled in the art. During the time when no gear is engaged in the transmission 6, the safety device 2 is actuated by a switch 61 with conventionally associated gear change mechanism 62, and the clutch pedal is held locked firmly in the actuated position 12. As FIG. 2 shows, this is possible, for example, through a clamping device 21 that holds the piston rod 34 locked firmly. Alternatively, the information that no gear is engaged in the transmission 6 is conveyed to the solenoid valve 26 of the pressure operated clamp 21 by the switch 61 through the electronic unit 8 or even directly, and in that case the clamping takes place by the pressure cylinder 22, shown in FIG. 2.

However, solenoid 23 that operates the clamp 24 can be controlled by switch 61 through the electronic unit 8 or the operation can be directly controlled. During the clamping of the safety device 2, the driver does not feel any restoring force on the clutch pedal as would be affected by return spring 44. Thus he knows that no gear is engaged in the transmission.

The clamp means reliably prevents return movement of the clutch pedal. Upon the engaging of a gear in the transmission, actuation of the solenoid valve 26 and the solenoid 23 ceases and both of them are returned to their initial position by spring bias power sequential to cessation of the clamping. Now the driver can engage the clutch in the usual way again and return the clutch pedal to the idle position 11 more quickly or more slowly, depending upon what is required. Where no shifting of gears is to be performed, the clutch pedal 1 can also be brought into its neutral position 11, by an actuation of the selector device 9. Safety device 2 is bypassed in the neutral position and it is possible to shut the vehicle off with no gear engaged.

What claim:

1. An auxiliary power actuated clutch and gear shifting device for a motor vehicle transmission (6) including a gear preselector and a gear change mechanism controlled by vehicle driver through a clutch actuated mechanism adjacent a clutch pedal (1); means for providing a response signal to the driver when a gear is engaged in the transmission (6) after the shifting of gears;

the improvement wherein:

a safety device (2) is provided mechanically connected with the clutch pedal (1) operative to hold an actuated clutch pedal (1) in the actuated position for restoration to idle position only when a gear has been engaged in the tansmission (6) or when the transmission (6) has been shifted into neutral; including a function selection device (9) independent of the gear shifting device and effective to shift the transmission (6) into neutral; wherein said safety device (2) has a clamping device (210) to secure the clutch pedal (1) in an actuated position when a gear is disengaged in the transmission (6) for the purpose of shifting gears and secures said clutch pedal (1) until a gear is again engaged in said transmission (6); wherein the clamping device (210) is held in clamped condition by a solenoid (23).

2. An auxiliary power actuated clutch as set forth in claim 1, wherein said clamping device (210) has a set of saw teeth mechanically connected to the clutch pedal (1) and coacting with a second set of saw teeth, said sets being variably positionable responsive to an actuated poisiton of said clutch pedal, said second set being on a jaw movable for interengagement with said first set by operation of said solenoid.

* * * * *